United States Patent
Haldar et al.

(10) Patent No.: US 11,128,471 B2
(45) Date of Patent: Sep. 21, 2021

(54) ACCESSIBILITY CONTROLS IN DISTRIBUTED DATA SYSTEMS

(71) Applicant: Microsoft Technology Licensing, LLC, Redmond, WA (US)

(72) Inventors: Abhijeet Haldar, Hyderabad (IN); Imran Siddique, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 16/394,769

(22) Filed: Apr. 25, 2019

(65) Prior Publication Data
US 2020/0344062 A1     Oct. 29, 2020

(51) Int. Cl.
| | |
|---|---|
| H04L 9/32 | (2006.01) |
| G06F 21/60 | (2013.01) |
| H04L 9/30 | (2006.01) |
| H04L 29/06 | (2006.01) |

(52) U.S. Cl.
CPC .......... H04L 9/3242 (2013.01); G06F 21/602 (2013.01); H04L 9/30 (2013.01); H04L 63/0428 (2013.01)

(58) Field of Classification Search
None
See application file for complete search history.

(56) References Cited

U.S. PATENT DOCUMENTS

| | | | |
|---|---|---|---|
| 9,853,977 B1 * | 12/2017 | Laucius | ............... H04L 63/0807 |
| 10,037,376 B2 * | 7/2018 | Cho | .................. G06F 9/505 |
| 10,084,826 B1 * | 9/2018 | Irwan | ................. G06F 21/552 |
| 10,764,036 B1 * | 9/2020 | Griffin | .................. H04L 9/083 |

(Continued)

FOREIGN PATENT DOCUMENTS

| | | |
|---|---|---|
| WO | 2018154581 A1 | 8/2018 |
| WO | 2018164695 A1 | 9/2018 |

OTHER PUBLICATIONS

Le et al. "Scalable and Secure Sharing of Personal Health Records in Cloud Computing Using Attribute-Based Encryption", IEEE Transactions on Parallel and Distributed Systems, vol. 24, No. 1, Jan. 2013 (Year: 2013).*

(Continued)

*Primary Examiner* — Piotr Poltorak
(74) *Attorney, Agent, or Firm* — Fiala & Weaver P.L.L.C.

(57) ABSTRACT

Methods, systems, apparatuses, and computer program products are provided for controlling data access and/or accessing data in a distributed network. An identifier may be generated for confidential data. A hash generator may generate a first hash of the confidential data, and generate a second hash based on the first hash and the identifier. A data packet set that includes the confidential data, the identifier, and the second hash may be encrypted and transmitted between nodes of the distributed network. A receiving node may decrypt the packet set using one or more appropriate encryption keys and regenerate the second hash from the confidential data and the identifier. The regenerated hash may be compared against the decrypted hash to authenticate the received confidential data and/or validated against a revocable hash stored in an array of the owning node that is accessible by any receiving node.

20 Claims, 8 Drawing Sheets

(56) References Cited

U.S. PATENT DOCUMENTS

| | | | |
|---|---|---|---|
| 2003/0126435 A1* | 7/2003 | Mizell | H04M 15/61 |
| | | | 713/168 |
| 2004/0128498 A1* | 7/2004 | Lang | H04L 63/08 |
| | | | 713/153 |
| 2006/0101009 A1* | 5/2006 | Weber | G06F 16/14 |
| 2011/0138192 A1* | 6/2011 | Kocher | H04L 9/3247 |
| | | | 713/189 |
| 2011/0206200 A1* | 8/2011 | Sovio | H04L 9/3073 |
| | | | 380/30 |
| 2014/0351581 A1* | 11/2014 | Pritikin | H04L 9/3268 |
| | | | 713/158 |
| 2015/0222603 A1* | 8/2015 | Uzun | H04L 9/0816 |
| | | | 713/160 |
| 2016/0142409 A1 | 5/2016 | Frei et al. | |
| 2018/0146071 A1* | 5/2018 | Himayat | H04L 41/5006 |
| 2018/0367316 A1* | 12/2018 | Cheng | H04L 9/3247 |
| 2019/0052466 A1 | 2/2019 | Bettger | |

OTHER PUBLICATIONS

"International Search Report and Written Opinion Issued in PCT Application No. PCT/US20/022879", dated Jul. 1, 2020, 10 Pages.

* cited by examiner

700

702 — Store, in a second array, a root hash of all of the hashes stored in a first array

802 — Receive, in a first node, an encrypted data packet set that includes confidential data, an identifier of the confidential data, and a second hash based on a first hash of the confidential data 804 — Decrypt the data packet set to extract the confidential data, the identifier, and the second hash 806 — Generate a third hash based on the confidential data 808 — Generate a fourth hash based on the third hash and the identifier 810 — Authenticate the confidential data based at least on a comparison of the second hash and fourth hash

FIG. 8

ACCESSIBILITY CONTROLS IN DISTRIBUTED DATA SYSTEMS

BACKGROUND

In distributed systems, data is stored across many different nodes of a network. The number of nodes can vary significantly in a given distributed network and can range anywhere from a few nodes to hundreds of thousands or even millions of network nodes. However, because data is stored and constantly exchanged across the different nodes, challenges have arisen in the management of data security, data integrity, and data accessibility. Typically, when a user in a distributed network desires to share the user's confidential data with another user, the user may implement certain protection methods to limit access to the data, such as password protection. However, existing solutions lack meaningful controls on how the data may be further shared or accessed by other nodes. In addition, the confidential data that is shared is typically not protected from tampering, which may enable any node to intentionally or unintentionally alter the confidential data prior to subsequent sharing to another node. As a result, the owner the data is typically unable to adequately control and protect its own confidential data on distributed networks.

In other systems, such as where data may be stored in one or more centralized parts of a network (e.g., in cloud-based services), owners of confidential data typically must rely on existing protections provided by the service maintaining the data. Even in such systems, however, owners of confidential data still lack meaningful safeguards in the control and access of their data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for controlling data access and/or accessing data in a distributed network. In an aspect, an identifier may be generated for confidential data, such as a unique string of characters. A hash generator may generate a first hash of the confidential data and generate a second hash based on the first hash and the identifier. A data packet set that includes the confidential data, the identifier, and the second hash may be encrypted using one or more encryption techniques and subsequently transmitted, e.g., from an owning node to a first receiving node that are both part of the distributed network.

In this manner, a receiving node may decrypt the packet set using one or more appropriate encryption keys and regenerate the second hash using the confidential data and the identifier. The regenerated hash may be compared against a decrypted hash that was received in the packet set to authenticate the received confidential data. In addition, the decrypted hash may also be validated against a revocable hash stored in an array of the owning node that is accessible by any receiving node. As a result, confidential data may be shared and/or accessed in a manner that is both secure and controllable by the owning node.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 7 shows a flowchart of a method for storing, in another array, a root hash, according to an example embodiment.

FIG. 8 shows a flowchart of a method for accessing data in a distributed network, according to an example embodiment.

FIGS. 9A-8B shows an illustrative example for controlling access of data in a distributed network, according to an example embodiment.

Figure 1:
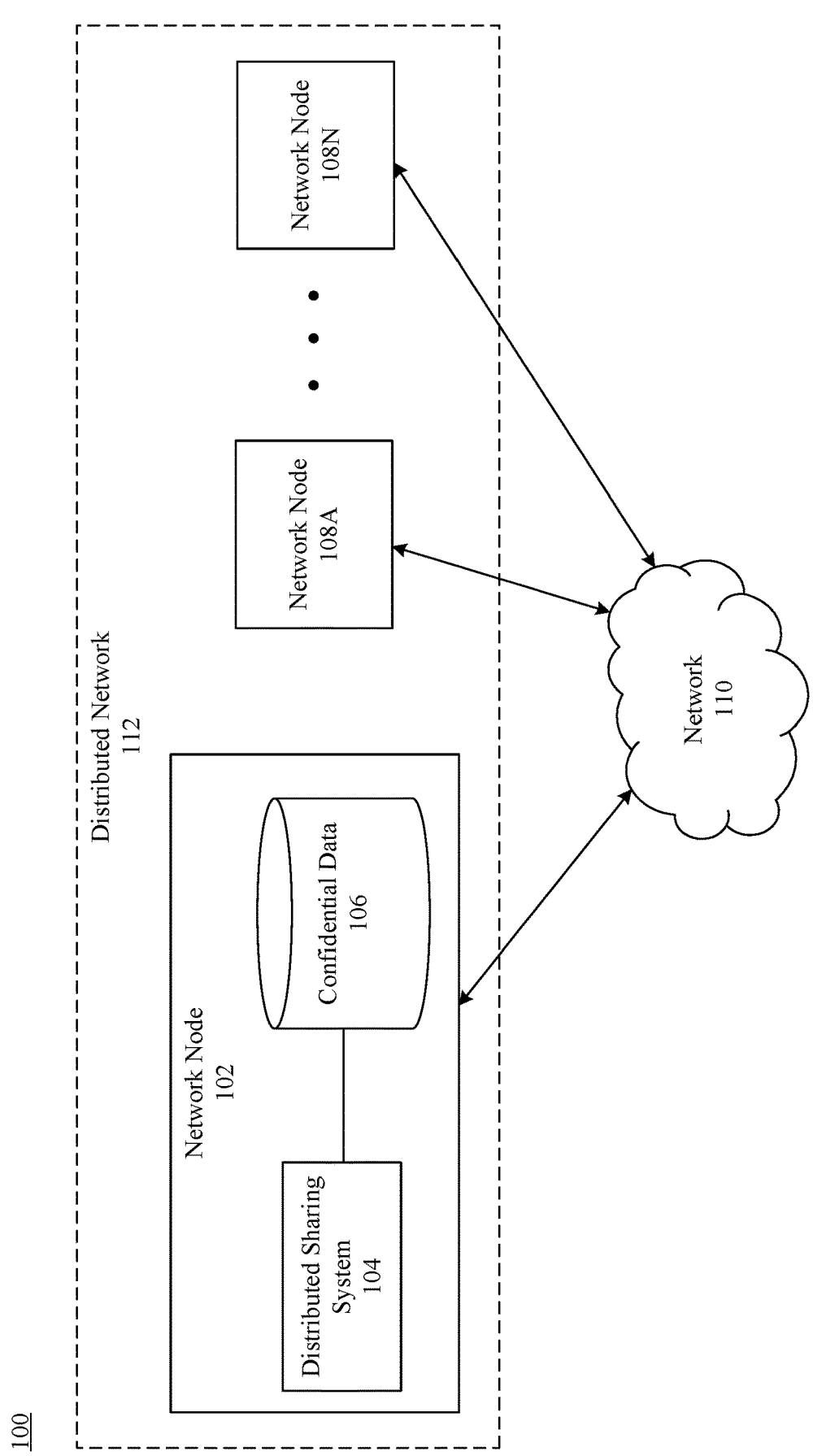
FIG. 1 shows a block diagram of a system for controlling access to data in a distributed network, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

In distributed systems, data is stored across many different nodes of a network. The number of nodes can vary significantly in a given distributed network and can range anywhere from a few nodes to hundreds of thousands or even millions of network nodes. However, because data is stored and constantly exchanged across different nodes, challenges have arisen in the management of data security, data integrity, and data accessibility. Typically, when a user in a distributed network desires to share the user's confidential data with another user, the user may implement certain protection methods to limit access to the data, such as password protection. However, existing solutions lack meaningful controls on how the data may be further shared or accessed by other nodes. In addition, the confidential data that is shared is typically not protected from tampering of the data, which may enable any node to intentionally or unintentionally alter the confidential data prior to subsequent sharing to another node. As a result, the owner the data is typically unable to adequately control and protect its own confidential data on distributed networks.

In other systems, such as where data may be stored in one or more centralized parts of a network (e.g., in cloud-based services), owners of confidential data typically must rely on existing protections provided by the service maintaining the data. Even in such systems, however, owners of confidential data still lack meaningful safeguards in the control and access of their data.

Embodiments described herein address these and other issues by providing a system for controlling access to data in a distributed network. In an example system, an identifier, such as a unique character string, is generated for confidential data to be shared. A hash generator may generate a first hash of the confidential data. The hash generator may further generate a second hash of the confidential data and the identifier. An encrypter may be configured to encrypt the confidential data and the identifier using a first key (e.g., a public key of a receiving node), and encrypt the second hash using a second key (e.g., a private key of the owning or transmitting node). A packet set comprising the encrypted confidential data, identifier, and second hash may be transmitted to the receiving node.

In examples, the receiving node may decrypt the received data to unpack the confidential data, identifier, and second hash. The receiving node may be configured to authenticate the received confidential data by regenerating the second hash in a similar manner that the owning node generated the hash. If the regenerated second hash is the same as the decrypted hash, the receiving node may automatically authenticate the received confidential data (e.g., that the data was transmitted by the owning node in an unaltered fashion). In further examples, a receiving node may also be configured to validate the regenerated second hash against a corresponding entry in an array of the owning node that contains the second hash.

Controlling access to data in this manner has numerous advantages, including providing improvements to the functioning of distributed networks. For instance, techniques described herein enable confidential data onboarded on a distributed network to be shared between nodes seamlessly in a manner that is secure and maintains the integrity of the data. Furthermore, by providing mechanisms in the distributed network for validating confidential data received from other nodes of the network, the network itself is improved over conventional systems where such validation of information received over a distributed network is lacking. Still further, example embodiments disclosed herein for the seamless and secure sharing of data may be implemented in distributed networks that do not require the need of a central governance platform, thereby reducing the resources necessary for the proper functioning of the distributed network and enabling the distributed network to operate through a set of self-governed heterogeneous nodes.

In addition, techniques described herein also provide improvements to the security of nodes coupled to the distributed network. For example, by sharing data between nodes in a secure, controllable, and revocable manner as described herein, the likelihood of sensitive data being compromise is reduced, thereby avoiding the need for additional or otherwise unnecessary security software package being executed on each node.

Example implementations are described as follows for systems and methods for controlling access to data in a distributed network. For instance, FIG. 1 shows a block diagram of a distributed system 100, according to an example embodiment. As shown in FIG. 1, system 100 includes a network node 102 and network nodes 108A-108N, one or more of which may be communicatively coupled by a network 110. In an example, network node 102 and network nodes 108A-108N collectively form a distributed network 112. For instance, any of network node 102 and network nodes 108A-108N in FIG. 1 may be communicatively coupled to any other entity shown (or not shown) via network 110. As used herein, distributed network 112 may comprise any number of network nodes, including those illustrated in FIG. 1 and optionally one or more further network nodes not expressly illustrated. As shown in FIG. 1, network node 102 includes a distributed sharing system 104 and stores confidential data 106. Although not expressly illustrated, one or more of network nodes 108A-108N may similarly include distributed sharing system 104 and/or confidential data 106. As described in greater detail below, distributed sharing system 104 may be configured to enable a network node to control access to confidential data 106 when shared with one or more other network nodes, and/or enable a network node to access such confidential data when receiving it from a sharing node. System 100 is further described as follows.

Network 110 may include one or more of any of a local area network (LAN), a wide area network (WAN), a personal area network (PAN), a combination of communication networks, such as the Internet, and/or a virtual network. In example implementations, network nodes of distributed network 112 may be communicatively coupled to each other via network 110. In an implementation, network node 102 and network nodes 108A-108N may communicate via one or more application programming interfaces (API), and/or according to other interfaces and/or techniques. Network node 102 and/or network nodes 108A-108N may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Distributed network 112 may comprise any type of network in which computing resources and/or data may be shared or spread across a plurality of nodes coupled to the network. Distributed network 112 may include, but is not limited to, a blockchain network or other network in which a log or history of transactions may be spread across a plurality of nodes to enhance data integrity. For instance, distributed network 112 may comprise a number of chains or sub-chains in which transactions or events taking place across nodes of distributed network 112 may be stored, verified, and/or authenticated. In some other examples, distributed network 112 may comprise a collection of network nodes that lack a central governance or management node, and/or that lack a central server through which the data is stored and/or routed. For instance, distributed network 112 may comprise any non-sovereign set of heterogenous nodes that are self-governed. As an example, distributed network 112 may comprise any network in which each network node coupled to distributed network 112 share data (e.g., confidential data) in a peer-to-peer fashion. Implementations are not limited to these illustrative examples, and may include any other type of distributed network in which data may be spread across nodes as appreciated by those skilled in the art.

Network node 102 and/or network node(s) 108A-108N may comprise any node of distributed network 112 executing one or more distributed binaries, applications, and/or services that may interface with one or more chains or sub-chains executing across the network A node of distributed network 112 may include, but is not limited to any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), a server (or a set of servers, such as a server farm), a data center, etc. Network nodes are not limited to physical machines, and may include other types of network entities, such as a virtual machine or the like coupled to distributed network 112 and similarly executing a distributed binary, application and/or service.

Collectively, network node 102 and/or network node(s) 108A-108N may be coupled to each other to store, manage, and process data in a distributed network infrastructure, e.g., as a heterogenous set of devices. Network nodes of distributed network 112 computing devices of users (e.g., individual users, family users, enterprise users, governmental users, etc.) that may share and/or access data of other users via the distributed network. Distributed network 112 may comprise any number of network nodes, including nodes not expressly illustrated in FIG. 1, and may include tens, hundreds, thousands, millions, or even greater numbers of network nodes. Network nodes of distributed network 112 may each interface with each other through APIs and/or by other mechanisms. Note that any number of program interfaces may be present. Network nodes of distributed network 112 are not limited to processing devices in implementations, and may include other resources on a network, such as storage devices (e.g., physical storage devices, local storage devices, cloud-based storages, hard disk drives, solid state drives, random access memory (RAM) devices, etc.), databases, etc.

Distributed sharing system 104 is configured to enable any network node of distributed network 112 to share and/or access data, including but not limited to confidential data 106, with or from any other network node of distributed network 112 in a controllable, secure and/or verifiable manner. For instance, in implementations, distributed sharing system 104 may be configured to automatically validate that data received from another node is original (i.e., authentic), and/or not modified in any manner (e.g., purged, altered, adulterated, etc.). In an illustrative example, a user of a first node may share the user's employment history with another node on the distributed network (e.g., an entity or company requesting the employment history). In accordance with example embodiments described here, distributed sharing system 104 may automatically authenticate that the claim of the user (i.e., that the shared employment history was not modified by another entity). As will be described in greater detail below, distributed sharing system 104 may automatically authenticate the user's claim in various ways, including but not limited to validating a received hash against a regenerated hash and/or comparing the received hash to a hash stored in an accessible array of the sharing user. Furthermore, the user may revoke the hash from the accessible array through a suitable user interface, thereby preventing any further authentication of the user's claim. In this manner, the user may share data in a manner that is controllable, secure and verifiable.

Confidential data 106 may include any data that is confidential, critical, private, secure, and/or not otherwise intended for public dissemination. For instance, confidential data 106 may include identifying information of a user (e.g., an educational profile, a professional profile, an employment history, a user profile, a dating profile, etc.), health information or medical records of a user, financial or tax information, business statements, legal documents, biographic information (e.g., copies of birth certificates, driver's licenses, passports), etc. These examples are illustratively only, and confidential data 106 may include any other type of data that a user of a network node may selectively share with another user in a non-public fashion. In some further implementations, confidential data 106 may be generated on and/or onboarded (e.g., from another storage device, such as a centralized storage or cloud-based storage). Confidential data 106 may be stored on one or more network nodes in a secure manner, such as via password protection, encryption (e.g., public and private key encryption, symmetric keys, etc.), or any other secure manner as appreciated by those skilled in the relevant arts such that read/write access may be performed only by the owner of the data. It is also noted and understood that although implementations are described with reference to sharing confidential data 106, distributed sharing system 104 may also be configured to share public information in a similar manner.

It is noted and understood that implementations are not limited to the illustrative arrangement shown in FIG. 1. Rather, network 110 may comprise any number of networks, subnets, distributed networks, network nodes (including but not limited to machines and/or virtual machines) coupled in any manner. Furthermore, any one or more of network node 102 and/or network nodes 108A-108N may be co-located, located remote from each other, may be implemented on a single computing device or virtual machine, or may be implemented on or distributed across one or more additional computing devices or virtual machines not expressly illustrated in FIG. 1.

In some other example embodiments, any one or more of network node 102 and/or network nodes 108A-108N may be implemented on one or more servers. For instance, confidential data 106 may be stored in a secure fashion on an appropriate network node via a password and/or suitable encryption techniques, including but not limited to symmetric key algorithms (e.g., using an identical key for encryption and decryption), asymmetric key or public key algorithms (e.g., using different keys for encryption and decryption), or any other suitable technique appreciated to those skilled in the relevant arts. Furthermore, although FIG. 1 depicts a single network node 102 that includes distributed sharing system 104, it is understood that implementations may comprise any number of such network nodes. An example computing device that may incorporate the functionality of network node 102 and/or network nodes 108A-108N is described below in reference to FIG. 10.

Figure 2:
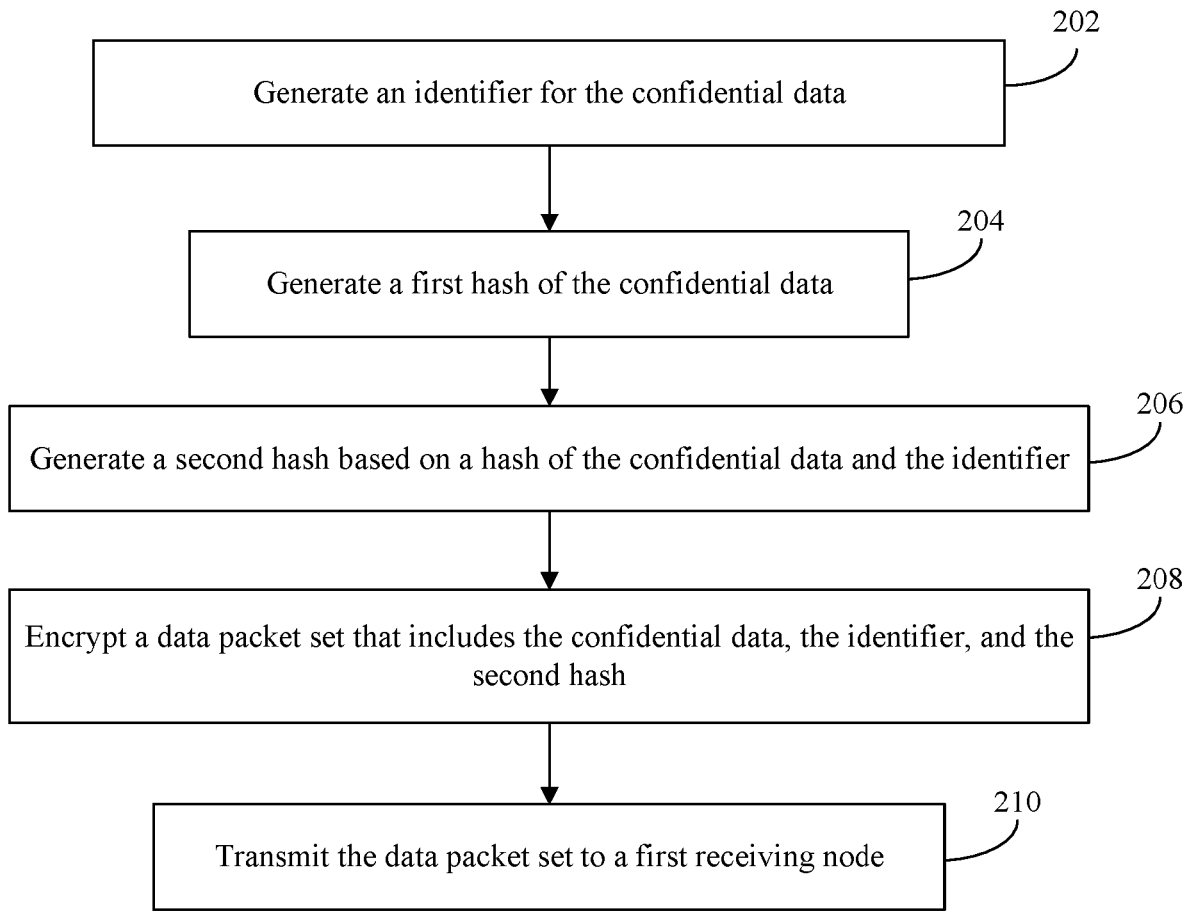
FIG. 2 shows a flowchart of a method for controlling access to data in a distributed network, according to an example embodiment.

Distributed sharing system 104 may operate in various ways to control access to data in a distributed network. For instance, distributed sharing system 104 may operate according to FIG. 2. FIG. 2 shows a flowchart 200 of a method for controlling access to data in a distributed network, according to an example embodiment. For illustrative purposes, flowchart 200 and distributed sharing system 104 are described as follows with respect to FIG. 3.

Figure 3:
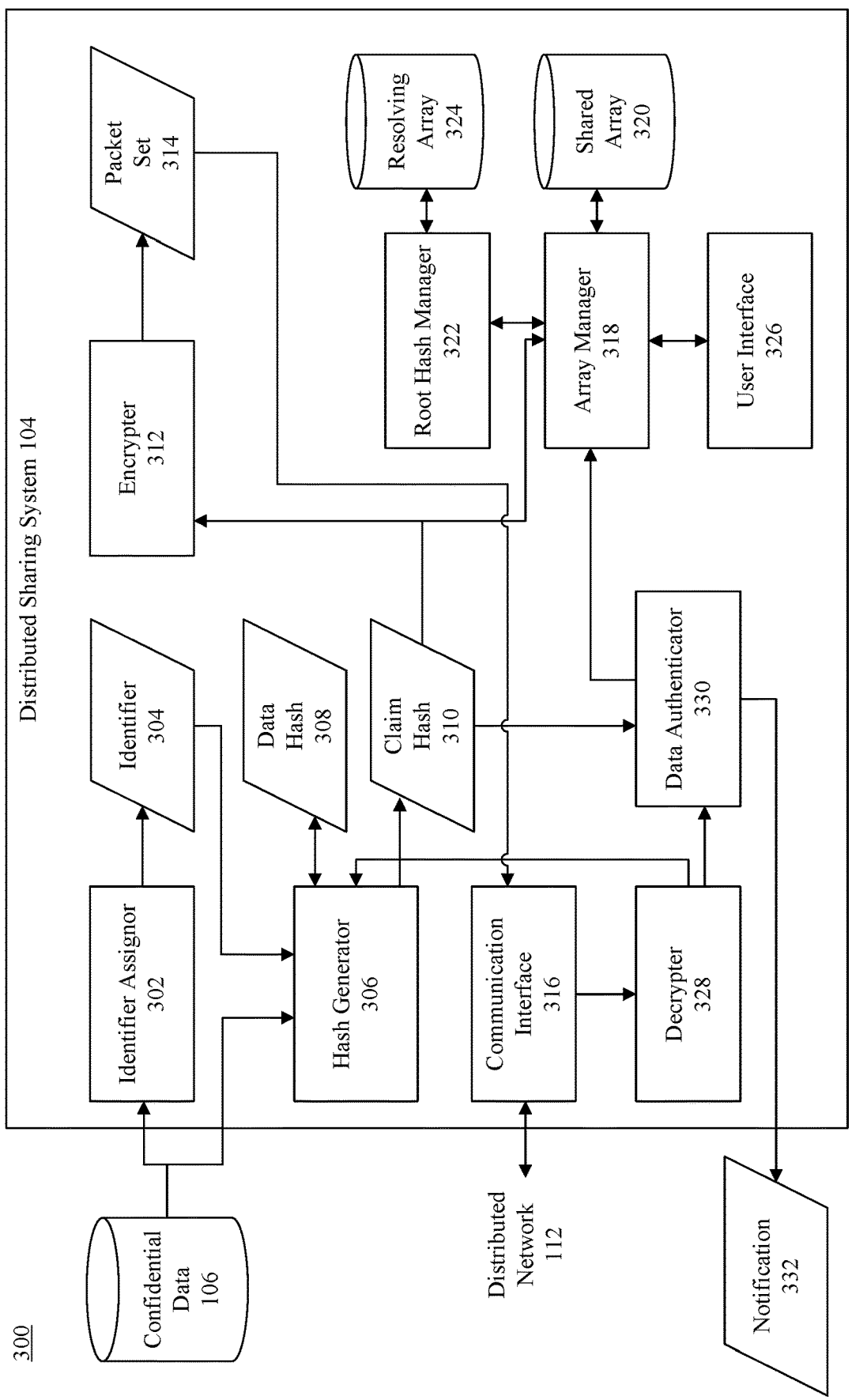
FIG. 3 shows a block diagram of a distributed sharing system, according to an example embodiment.

FIG. 3 shows a block diagram of a distributed sharing system 300, according to an example embodiment. As shown in FIG. 3, system 300 includes an example implementation of distributed sharing system 104. Distributed sharing system 104 includes an identifier assignor 302, a hash generator 306, an encrypter 312, a communication interface 316, an array manager 318, a root hash manager 322, a user interface 326, and a decrypter 328. As shown in FIG. 3, identifier assignor 302 may be configured to receive/obtain confidential data 106 and generate an identifier 304. Hash generator 306 may generate a data hash 308 and a claim hash 310. Encrypter 312 may be configured to generate a packet set 314 that includes confidential data 106, identifier 3014, and claim hash 310. As shown in FIG. 3, communication interface 316 may transmit packet set 314 to another node of distributed network 112. In implementations, array manager 318 may be configured to store claim hash 310 in a shared array 320. Root hash manager 322 may store a root hash of each hash of shared array 320 in a resolving array 324. As shown in FIG. 3, data authenticator 330 may be configured to generate a notification 332 indicating, for instance, a validation status of confidential data 106 received from another node. Flowchart 200 and system 300 are described in further detail as follows.

Flowchart 200 of FIG. 2 begins with step 202. In step 202, an identifier for confidential data is generated. For instance, with reference to FIG. 3, identifier assignor 302 is configured to generate identifier 304 for confidential data 106. In examples, identifier assignor 302 may generate identifier 304 for confidential data that is intended to be shared between two nodes of distributed network 112.

In some implementations, identifier assignor 302 may generate identifier 304 in response to a user interaction with a user interface of a network node. For example, a user of a requesting node (e.g., network node 108A) may transmit a request to a user of network node for confidential data 106 (e.g., a request for employment history). Such a request may be transmitted in any suitable manner, such as via a web application or other web-based interface, a mobile application, a desktop application, e-mail, text message, a chat message, or via any other software installed on or accessible by a requesting node may identify a request for confidential data. A user of the node in which confidential data 106 is stored may confirm the validity of the requesting node through one or more validation services of distributed network 112, such as a user directory, user database, and/or identity and access management service. An example of such a validation service includes, but is not limited to, Azure Active Directory (AAD), which may be queried by a suitable API such as Lightweight Director Access Protocol, both of which are offered by Microsoft Corporation of Redmond, Wash. These examples are illustratively only, and may include any other interface, software, signature, token, etc. for validating the identity of a user on distributed network 112.

In examples, upon an interaction with the appropriate interface as described above, a request for confidential data 106 may be accepted at network node 102. For instance, a user of network node 102 may interact with an interface or service, such as using a web interface, to identify and obtain a block corresponding to the requested data (employment history in this example). It is noted, however, a user of network node 102 need not share confidential data 106 only in response to accepting a request but may also share such data without a request.

In examples, upon identifying the block of confidential data 106 to be shared, identifier assignor 02 may generate identifier 304 that comprises a unique string of characters for identifying confidential data 106. For instance, identifier 304 may comprise a set of alphanumeric characters in any length, such as 8 bits, 32 bits, 64 bits, etc. In some examples, identifier 304 may be generated in a manner such that identifier 304 is unique or different from other generated identifiers. In other words, even if identifier assignor 302 generates identifier 304 for the same confidential data on separate occasions, identifier assignor 302 may operate in a manner such that the generated identifiers are different. As a result, each time confidential data 106 is to be shared, an identifier may be assigned that may be used to uniquely identify the data. Identifier assignor 302 may generate identifier 304 in various ways, including through a random alphanumeric character generation.

In step 204, a first hash of the confidential data is generated. For instance, with reference to FIG. 3, hash generator 306 may be configured to obtain confidential data 106 that is identified to be shared and generate data hash 308 therefrom. Hash generator 306 may include any one or more functions or algorithms to map confidential data 106 to a hash comprising a set of numbers and/or characters. In some examples, hash generator 306 may be configured to generate a hash that is a predetermined length (e.g., 16 characters, 32 characters, etc.), or generate a hash that has a dynamic length based on the inputted data. Data hash 308 may correspond to inputted data (e.g., confidential data 106) such that hash generator 306 may generate the same set of numbers and/or characters for the same set of input data. As a result, data hash 308 may be generated in a repeatable manner, enabling validation of confidential data 106 as will be described in greater detail below.

Although examples are described where hash generator 306 is configured to generate a hash, hash generator 306 is not limited to generating hashes, but may include any other type of token, key, signature, etc. that may be generated in a repeatable manner (e.g., generating the same output based on the same input). Hash generator 306 may be configured to generate hashes of input values in any fashion, including according to a hash function or hash algorithm, including, but not limited to, Secure Hash Algorithm (SHA)-0, SHA-1, SHA2, SHA-3 Digital Signature Algorithm (DSA), and/or the like.

In step 206, a second hash is generated based on the first hash and the identifier. For instance, with reference to FIG. 3, hash generator 306 may be configured to obtain identifier 304 and data hash 308 to generate a claim hash 310. Claim hash 310 may comprise a set of numbers and/or characters in a fixed or dynamic length that represents a particular claim made by a user of network node 102. For instance, where a user of network node 102 is sharing the user's employment history with a receiving node, the claim may represent that the shared employment history is authentic and has not been modified by any other user (e.g., by another node of distributed network 112). In this manner, because claim hash 310 is based on an identifier that may be unique to a set of data to be shared and data hash 308, claim hash 310 may similarly generated in a unique manner, i.e., that different claims may comprise different claim hashes. As a result, claim hash 310 may comprise a different claim hash for each claim made by a user of network node 102, even if confidential data 106 is the same.

In step 208, a data packet set including the confidential data, the identifier, and the second hash is encrypted. For instance, with reference to FIG. 3, encrypter 312 may be configured to encrypt packet set 314 that includes confidential data 106, identifier 304, and claim hash 310. In implementations, packet set 314 may comprise any number of data packets. Encrypter 312 may encrypt packet set 314 in any suitable manner, including but not limited to using symmetric keys, asymmetric keys, or any other cryptographic operation. In some example embodiments, encrypter 312 may selectively encrypt a first subset of data packets of packet set 314 using a first encryption technique (e.g., using a first key), and encrypt a second subset of data packets of packet set 314 using a second encryption technique (e.g., using a second key that is different than the first key).

Furthermore, in some example implementations, encryption of packet set 314 may also comprise one or more techniques for signing packet set 314 or a portion thereof (e.g., using a certain key or keys) to ensure that packet set 314 originated from a particular entity, thereby maintaining the integrity of packet set 314. A flowchart describing an example implementation of selectively encrypting packets of packet set 314 using different encryption techniques is described in greater detail with respect to FIG. 4.

In step 210, the data packet set is transmitted to a first receiving node. For instance, with reference to FIG. 3, communication interface 316 may be configured to transmit encrypted packet set 314 from owning node too another node of distributed network 112. The owning node is not limited to a node which is deemed an owner of confidential data 106 but may include any network node from which confidential data 106 initially originated. In the example of flowchart 200, for instance, the node 102 may be referred to as the owning node. In examples, packet set 314 may be transmitted to any receiving node identified by a user of node 102, such as a node that initially requested confidential data 106 to be shared. Communication interface 316 may comprise any suitable network interface, including but not limited to a LAN, WAN, PAN, a combination of communication networks (e.g., the Internet), and/or a virtual network that enables a first node (e.g., the owning node), to communicate with any other node in a peer-to-peer manner, such as in a distributed network.

Figure 4:
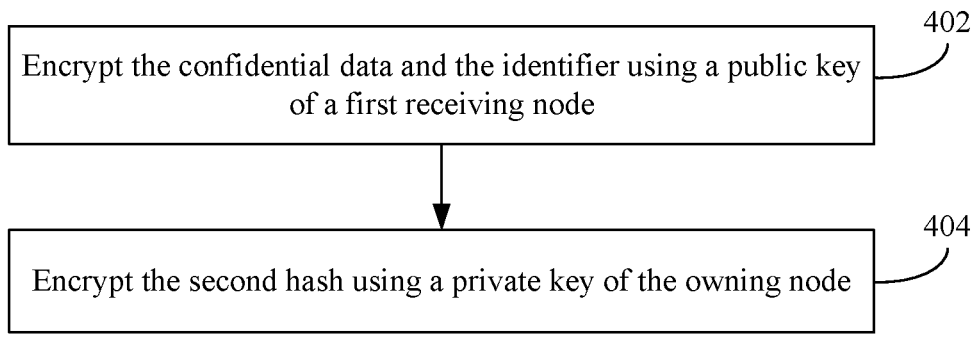
FIG. 4 shows flowchart of a method for encrypting a data packet set, according to an example embodiment.

As described above, encrypter 312 may be configured to encrypt packet set 314 in various ways. For example, FIG. 4 shows a flowchart 400 of a method for encrypting a data packet set, according to an example embodiment. In an implementation, the method of flowchart 400 may be implemented by encrypter 312. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, the confidential data and the identifier are encrypted using a public key of a first receiving node. For instance, with reference to FIG. 3, encrypter 312 may be configured to encrypt a subset of packet set 314 that includes confidential data 106 and identifier 304 using a public key of the node to which the confidential data is to be shared (e.g., a node requesting a user's confidential data in some implementations). Encrypter 312 may obtain the public key of the receiving node in various ways. In one example, encrypter 312 may obtain the public key of the receiving node by obtaining it from a universal index or chain accessible via distributed network 112 which may store the public keys for one or more nodes of the network. In some other implementations, such as where the receiving node initially transmits a request to a user for confidential data (e.g., a professional profile), the request itself may comprise the public key of the receiving node for utilization by encrypter 312 to encrypt the confidential data and the identifier. It is also contemplated that encrypter 312 may comprise any other mechanism for obtaining the public key of the receiving node, and is not limited to the aforementioned examples.

Thus, in some example embodiments, 312 may obtain confidential data 106 and identifier 304 as plaintext and encrypt such information using a public key of the receiving node. As a result of encrypting a subset of packet set 314 including confidential data 106 and identifier 304 using the receiving node's public key, this subset of packet set 314 can be decrypted only using the private key of the receiving node, which is accessible only to the receiving node. In this manner, confidential data 106 remains secure when communication interface 316 transmits packet set 314 across distributed network 112.

In step 404, the second hash is encrypted using a private key of the owning node. For instance, with continued reference to FIG. 3, encrypter 312 may be configured to encrypt a subset of packet set 314 that includes claim hash 310 with a private key of the node from which confidential data 106 originates (e.g., the node corresponding to the user that owns confidential data 106). As a result, once encrypted using a private key of the owning node, the receiving node may decrypt this subset of packet set 314 only by using the public key of the owning node, which may be accessible via a universal index of distributed network 112 and/or transmitted along with packet set 314. In this manner, the subset of packet set 314 that includes claim hash 310 may be signed by the owning node to ensure that the subset of packet set 314 is authentic (i.e., originated from the owning node).

For instance, if the subset of packet set 314 comprising claims hash 310 was encrypted using any other private key (i.e., a key other than the private key of the owning node), the receiving node may not successfully decrypt the subset of packet set 314 using the owning node's public key. As a result, encrypter 312 may be configured to encrypt sensitive data using a public key of the receiving node, as described in step 402, while separately signing a claim hash using a private key of the owning node, thereby ensuring that the transmitted information is both secure and authentic.

Figure 5:
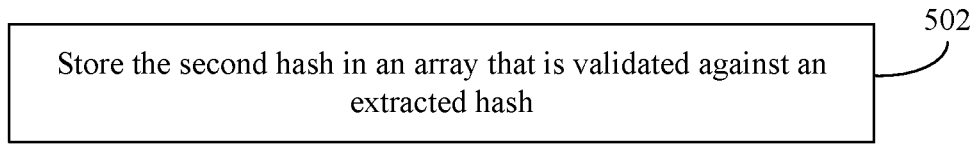
FIG. 5 shows a flowchart of a method for storing a hash in an array, according to an example embodiment.

As described above, a claim hash validated against an array in some implementations. For example, FIG. 5 shows a flowchart 500 of a method for storing a hash in an array, according to an example embodiment. In an implementation, the method of flowchart 500 may be implemented by array manager 318 and shared array 320. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a second hash is stored in an array that is validated against an extracted hash. For instance, with reference to FIG. 3, array manger 318 may be configured to store claim hash 310 in shared array 320 in some implementations. Shared array 320 may comprise an unencrypted array accessible on distributed network 112 by one or more nodes, such as a ledger or log stored in any suitable fashion. In some instances, shared array 320 may comprise one or more claim hashes that are not encrypted (e.g., the content of shared array 320 may be stored in a manner such that the claim hashes are publicly accessible by other nodes). In this manner, other nodes may openly access hashes stored in shared array 320 for validation.

In some example implementations, shared array 320 may be accessible via a chain or a sub-chain executing on distributed network 112. For instance, each node may interface with a respective chain or sub-chain to identify each claim hash 310 generated by the node (e.g., representing each instance that confidential data 106 was shared to another node) for storage in its respective shared array. In some further examples, each chain or sub-chain for a particular node may be configured to store, in shared array 320, each claim hash 310 and index and/or identifying information for the particular claim hash, such as the identity of the node associated with the claim (e.g., the receiving node), the date and/or time for which the claim hash was generated, or any other metadata associated with the claim hash.

In examples, shared array 320 may comprise any number of claim hashes. For instance, where a particular node has shared information to hundreds or even thousands of other nodes, shared array 320 for the particular node may comprise hundreds or thousands of claim hashes representing each instance that information was shared. As a result, each cell of array may comprise a unique bundled hash (i.e., a hash based on identifier 304 and confidential data 106) relating to a particular claim.

In one illustrative example, if a user of a node (e.g., network node 102) shares the confidential data 106 with two different network nodes, shared array 320 may comprise two separate entries, each based on a hash of the confidential data and the unique identifier generated for each entry. In this way, each entity for which the confidential data is shared may separately validate the received information with the hash corresponding to the claim for that particular entity.

Validation of a claim hash may be performed in various ways. For instance, when a receiving node receives packet set 314 via distributed network 112, decrypter 328 of the receiving node may be configured to decrypt the packet set to extract information contained therein. For example, where a subset of packet set 314 containing confidential information 106 and identifier 304 was encrypted using a public key of the receiving node as described above, decrypter 328 may be configured to decrypt this subset of packet set 314 using the private key of the receiving node to extract confidential information 106 and identifier 304. Furthermore, where another subset of packet set 314 containing claim hash 310 was encrypted using a private key of the owning node, decrypter 328 may be configured to decrypt this subset of packet set 314 using a public key of the owning node to extract the claim hash.

In examples, hash generator 306 of the receiving node may be configured to regenerate one or more hashes to validate the received information. For instance, hash generator 306 of the receiving node may regenerate a data hash from the received confidential data and regenerate a claim hash from the regenerated data hash and the received identifier. In some examples, the regenerated claim hash may be compared against the extracted claim hash (i.e., decrypted using the public key of the owning node). In some other examples, the regenerated claim hash and/or the extracted claim hash may be validated against a claim hash stored in shared array 320 that is accessible to the receiving g node. For instance, where the receiving node locates a claim hash in shared array 320 corresponding to the regenerated claim hash and/or the extracted claim hash, data authenticator 330 may validate that the received information is authentic and/or not altered. In other examples, where the receiving node fails to locate a corresponding claim hash in shared array 320, data authenticator 330 may not validate that the received data is authentic and/or not altered. FIG. 8, described in greater detail below, describes an example flowchart for authenticating received information in accordance with techniques described herein.

Figure 6:
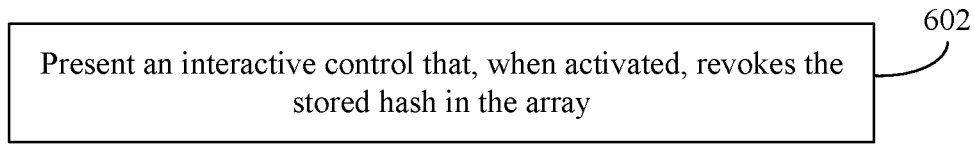
FIG. 6 shows a flowchart of a method for revoking a hash stored in an array, according to an example embodiment.

As described above, a claim hash stored in shared array 320 may be revoked. In examples, FIG. 6 is a flowchart of a method for revoking a hash stored in an array, according to an example embodiment. In an implementation, the method of flowchart 600 may be implemented by shared array 320 and user interface 326. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, an interactive control is presented that, when activated, revokes a stored hash in an array. For instance, with reference to FIG. 3, user interface 326 may comprise one or more interactive controls that may be activated to revoke a particular claim hash 310 stored in shared array 320. User interface 326 may be configured to display, among other things, one or more claim hashes stored in a particular node's shared array 320, one or more claims or associations which have been shared with the particular node by another node, and/or any confidential data of the node. In implementations, user interface 326 may be secured in a manner (e.g., via password protection, encryption, etc.) such that only the owner of a node may access its corresponding shared array 320 and/or an array comprising claims shared by other nodes, thereby preventing unauthorized modification to the particular node's arrays by any other node. The interactive control in user interface 326 may comprise any selectable graphical user interface (GUI) element, including but not limited to button, icon, hyperlink, etc. In some other implementations, the interactive control may be carried out via a voice and/or touch screen input (e.g., via a smartphone, a tablet, etc.).

When activated, the interactive control may be configured to revoke any one or more claim hashes stored in shared array 320. For instance, the interactive control when activated, may delete, alter, hide, or otherwise change the contents of shared array 320 such that the particular claim hash is no longer present or different from a previous iteration of the claim hash. As a result, if receiving node attempts to validate a regenerated claim hash and/or an extracted claim hash against shared array 320, validation would not be successful where the stored hash is revoked. Thus, even if a network node has received confidential data from any other node on distributed network 112, validation can occur only if a corresponding claim hash is located in shared array 320. Otherwise, validation of the received confidential data is not performed. In this manner, because the owner of the confidential data (i.e., the entity that originally shared the information) may selectively revoke any particular claim hash in shared array 320, the owner is provided with enhanced control over the validity of its own data, even if shared on distributed network 112 without the owner's permission.

In some example implementations, distributed sharing system 104 may interface with a resolving array to enhance data integrity. For instance, FIG. 7 is a flowchart of a method for storing, in another array, a root hash, according to an example embodiment. In an implementation, the method of flowchart 700 may be implemented by root hash manager 322 and resolving array 324. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a root hash of at least one of the hashes stored in a first array are stored in a second array. For instance, with reference to FIG. 3, root hash manager 322 may be configured to interface with a sub-chain executing on distributed network 112 to generate and store a root hash of at least one (or all) of the claim hashes stored in shared array 320 for a particular network node. For instance, each time a particular network node shares a claim hash with another node or receives a claim hash from another node, an array of the particular network node may be updated to reflect the shared or received claim hash. Such a transaction may also cause root hash manager 322 to compute an updated root hash based on one or more of the previous hashes, including the newly shared or received claim hash for storing in resolving array 324.

In one example implementation, root hash manager 322 may comprise a universal resolver that may interface with a sub-chain that is carrying such a root hash in a format as follows: {hash: sharedPlainText, root: hash+previousHash, location: previousLocation+1}. In other words, upon the occurrence of a new transaction (e.g., a new instance of data being shared or received), the transaction may be recorded in resolving array 324 in a manner that the new root hash is tied to a previous root hash. As a result, once a new transaction is created and a new root hash is stored, any attempt to tamper with a particular node's shared array 320 (e.g., by altering a claim hash or the underlying data) would not succeed, because the root hash of the tampered array would be inconsistent with the root hash stored in resolving array 324. Other techniques may also be implemented by root hash manager 322, including but not limited to cryptographic hashing techniques that may be implemented in blockchain transactions as appreciated by those skilled in the relevant arts. In this manner, the integrity of each node's arrays (e.g., shared array 320) may be protected against unauthorized tampering, further enhancing the security of distributed sharing system 104.

In some illustrative examples, root hash manager 322 may be configured to generate a Merkle tree in which each of the claim hashes may represent a child hash from which a root hash may be generated. Implementations are not limited to his example and may include any other type of hash tree that may be used to validate the integrity of transactions occurring on a distributed node with an array, ledger, log, etc. distributed across a plurality of nodes of distributed network 112.

Resolving array 324 need not be separate for each node of distributed network 112. Rather, a single resolving array 324 may be implemented and accessible by a plurality of (or all) nodes in the network. For instance, resolving array 324 may comprise a separate cell or entry for each node, with each node being identified by a unique identifier or locator. In examples, each cell may comprise a final hash (e.g., the root hash described herein) that may be validated against one or more of a given node's claim hashes.

In some further examples, the root hash may be stored in resolving array 324 in an encrypted manner (i.e., stored as ciphertext), such as being signed using each node's private key. As a result, even if an attempt to tamper with a particular cell of resolving array 324 occurred, the tampered cell could not be signed using the private key of the associated node, thereby preventing the node from being able to decrypt the root hash using its public key to cross-validating its root hash against the tampered value stored in the resolving array. In other words, storing the root hash in a signed manner ensures that only a particular node can update the contents of its associated cell. In these examples, therefore, attempt to tamper either the contents of shared array 320 or resolving array 324 would be automatically rejected.

As described above, confidential data received by a node of distributed network 112 may be accessed in various ways. In examples, FIG. 8 is a flowchart of a method for accessing data in a distributed network, according to an example embodiment. In an implementation, the method of flowchart 800 may be implemented by distributed sharing system 104. FIG. 8 is described with continued reference to FIG. 3. Other structural and operational implementations will be apparent to persons skilled in the relevant art(s) based on the following discussion regarding flowchart 800 and system 300 of FIG. 3.

Flowchart 800 begins with step 802. In step 802, an encrypted data packet set is received in a first receiving node from an owning node, the data packet set including confidential data, an identifier for the confidential data, and a second hash based on a first hash of the confidential data and the identifier. For instance, with reference to FIG. 3, communication interface 316 of a first receiving node (e.g., any of network nodes 102A or 108A-108N which receives confidential data 106 from another network node) may receive packet set 314 transmitted via distributed network 112 that includes both the receiving node and owning node.

In examples, packet set 314 may be generated by an owning node in a similar manner as described previously.

For instance, packet set 314 may comprise, in an encrypted manner, confidential data 106, identifier 304, and claim hash 310. Packet set 314 may include such information encrypted using a plurality of techniques, including certain information (e.g., confidential data 106 and identifier 304) encrypted using a public key of the receiving node, and other information (e.g., claim hash 310) encrypted using a private key of an owning node.

In step 804, the data packet set is decrypted to extract the confidential data, identifier, and the second hash. For instance, with reference to FIG. 3, decrypter 328 may be configured to decrypt packet set 314 to extract information contained therein. As described earlier, different portions of packet set 314 may be encrypted using different keys. Accordingly, decrypter 328 may be configured to decrypt different portions of packet set 314 using a plurality of keys corresponding to the keys used during encryption. For instance, decrypter 328 may be configured to decrypt a first subset of packet set 314 using a private key of the receiving node to extract confidential data 106 and identifier 304 therefrom and decrypt a second subset of packet set 314 using a public key of the owning node to extract claim hash 310 therefrom. It is noted and understood that any other encryption and/or decryption techniques are also contemplated, and implementations are not limited to the illustrative examples described herein.

In step 806, a third hash is generated based on the confidential data. For instance, with reference to FIG. 3, hash generator 306 of the receiving node may be configured to regenerate a data hash based on the extracted confidential data 106. In implementations, hash generator 306 in the receiving node may be configured to generate a hash from input data (e.g., confidential data in this example) in the same manner that the hash generator of the owning node that initially generated the data hash. As a result, where confidential data is successfully transmitted across distributed network 112, hash generator 306 may be configured to generate a data hash that is the same as the data hash generated by the owning node.

In step 808, a fourth hash is generated based on the third hash and the identifier. For instance, with reference to FIG. 3, hash generator 306 may be configured to regenerate claim hash 310 based on the regenerated data hash 308 (i.e., the third hash in this example) and the extracted identifier 304. In implementations, hash generator 306 may regenerate claim hash 310 in the same manner that the owning node generated the claim hash for transmission to the receiving node.

In step 810, the confidential data is authenticated based at least on a comparison of the second hash and the fourth hash. For instance, with reference to FIG. 3, data authenticator 330 may be configured to compare the extracted claim hash (i.e., the second hash) and the regenerated claim hash 310 (i.e., the fourth hash). In instances where the extracted claim hash matches the regenerated claim hash, data authenticator 330 may determine that the received confidential data 106 is authentic, or in other words, that the received data was not altered in any way following the initial transmission by the owning node. Because hash generator 306 of the receiving node is configured to regenerate hashes in the same manner that was used by the owning node, a regenerated claim hash may be compared against an extracted claim hash to ensure that the received information is authentic.

In some other implementations, data authenticator 330 may be configured to validate confidential data 106 in different ways. For instance, data authenticator 330 may be configured to determine if the regenerated claim hash and/or extracted claim hash is stored in an array of the owning node. As described previously, an array manager of an owning node may be configured to store each separate claim hash in shared array 320 that may be accessed by one or more nodes that receive the owner's confidential data. Thus, when a receiving node receives confidential data 106 of an owning node, data authenticator 330 may be configured to authenticate the received confidential data in response to a determination that the regenerated claim hash and/or extracted claim hash is stored in the owning node's shared array 320. In implementations, where data authenticator 330 successfully authenticates the received confidential data, data authenticator 330 may also be configured to generate notification 332 indicating that the received data has been authenticated, verified, etc. As a result, users of a receiving node may be notified of an authentication status upon receiving confidential information from another node of distributed network 112.

If data authenticator determines that a corresponding hash is not present in the owning node's shared array 320, data authenticator 330 may not authenticate the received confidential information. In such examples, data authenticator 330 may be configured to generate notification 332 indicating that the received information has not been authenticated, could not be verified, etc. In some further implementations, in response to determining that the data is not authentic, data authenticator 330 may be configured to delete the received confidential data and/or prevent or otherwise inhibit the presentation of the received confidential data. In this manner, where unauthorized sharing of certain data does occur, such data may be automatically secured as an enhanced security measure.

Figure 9A:
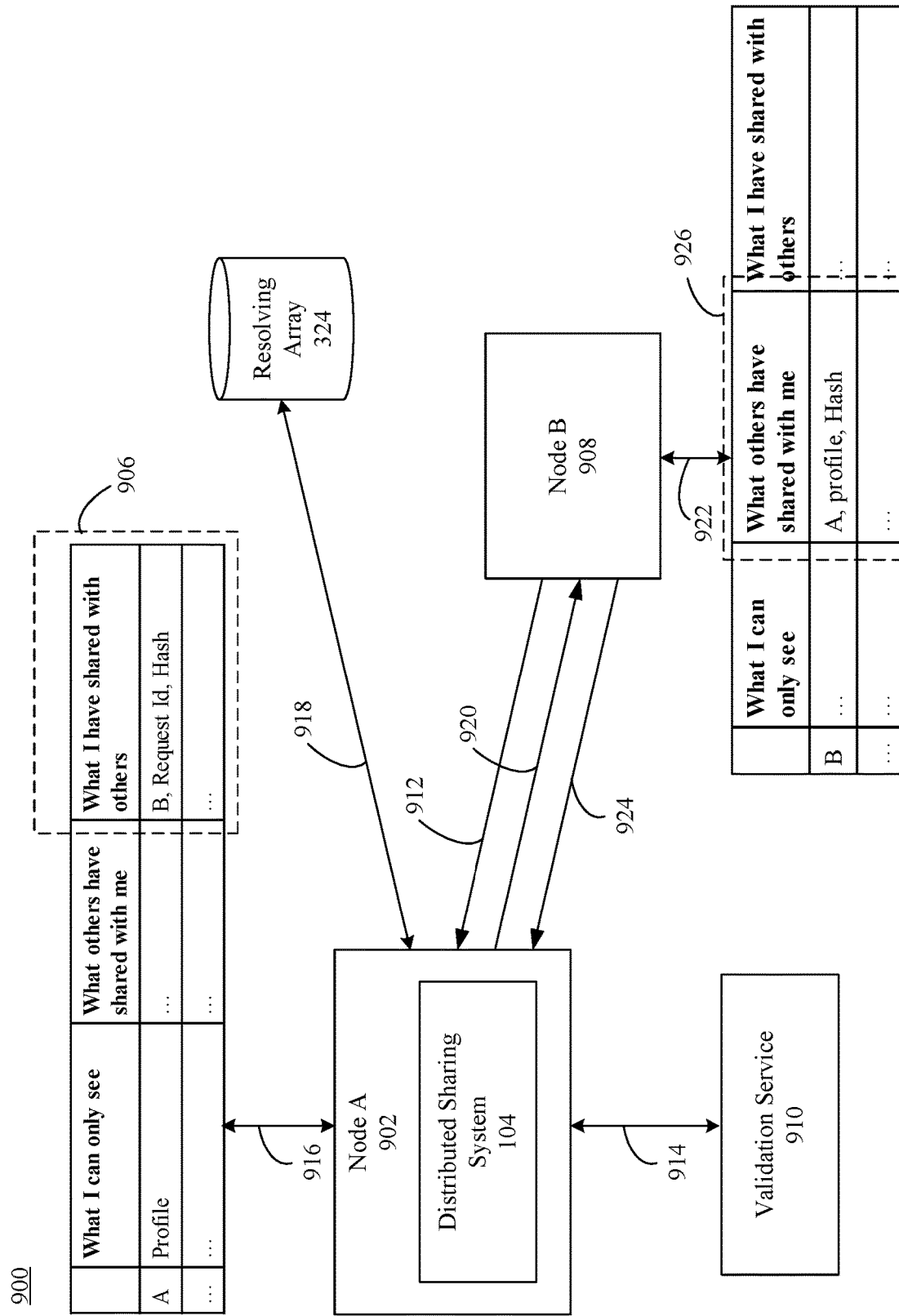

As described above, distributed sharing system 104 may be configured to control data access in a distributed network in various ways. FIGS. 9A-8B shows an illustrative example for controlling access of data in a distributed network, according to an example embodiment. For instance, FIG. 9A shows an example distributed system 900 that includes node 902 (node A), node 908 (node B), a validation service 910, a shared array 906, a shared array 926, and a resolving array 324. In the illustrative example of FIG. 9A, node 902 and node 908 are examples of network node 102 described herein. For instance, node 902 may comprise distributed sharing system 104. Similarly, although not expressly illustrated, node 908 may also comprise a distributed sharing system as described herein. Shared array 906 and shared array 926 are examples of shared array 320.

In the illustrative example of FIG. 9A, node 908 may request confidential data of node 902. For instance, the requested data may be profile data of a user of node 902, although example embodiments may cover any type of confidential data as described above. In this example, node 908 may transmit 912 a request to node 902 for such profile data to be shared with node 908. In an implementation, the request for profile data may be transmitted in any suitable manner, including but not limited to over an open channel of distributed network 112. The request may also comprise one or more data packets that are signed by node 908 (e.g., encrypted using the private key of node 908) such that node 902, upon receipt and decryption using a public key of node 908, may verify that the request originated from node 908. In some implementations, the request may also include the public key of node 908 which node 902 may subsequently use to verify that the request originated from node 908 and/or encrypt a subsequent data packet transmission (e.g., containing profile information). In some further examples, the request may also be encrypted using the public key of node 902, thus further ensuring that the request is transmitted in a secure manner.

In response to receiving the request, a user of node 902 may determine that the request is a valid request. In one example, the request may be determined to be valid by interfacing 914 with a validation service 910 that may validate the identify of node 908, as described previously. Upon validating the identity of node 908, the request may be accepted (e.g., via an application or interface onboarded for interaction with the distributed network). Distributed sharing system 104 of node 902 may obtain confidential data 106 (e.g., by obtaining an appropriate block of data that includes the requested profile information upon node 902 logging into and/or accessing an appropriate distributed chain). Identifier assignor 302 of node 902 may generate identifier 304 for confidential data 106 and hash generator 306 may generate data hash 308 for confidential data 106. Hash generator 306 may also be configured to generate claim hash 310 based on identifier 304 and data hash 308, as described herein.

Encrypter 312 of node 902 may generate packet set 314 that includes confidential data 106, identifier 304, and claim hash 310. In implementations, the confidential data (e.g., the profile information) and identifier may be encrypted using the public key of node 908, while claim hash 310 may be signed using the private key of node 902.

In some example embodiments, shared array 906 may also be configured to interface with one or more other sub-chains of distributed network 112. For example, distributed network 112 may comprise a plurality of chains or sub-chains that may be accessed by one or more network nodes, including but not limited to a main chain that a particular node may interact with to access data associated with the node (e.g., using a symmetric key or the like), a sub-chain that is publicly accessible for storing claims to be validated (e.g., shared array 906), a sub-chain that is accessible only for a particular node (e.g., using an encryption key) for storing information associated with claims that are shared with the particular node, and/or a sub-chain for interacting with a universal resolver.

Accordingly, in some examples, node 902 may interact with a sub-chain configured to store claim hash 310 in shared array 906, along with certain identifying information and/or metadata (e.g., the identity of node 908, an identifier associated with the initial request, etc.). As described previously, shared array 906 may be accessible to other nodes on a distributed network, including node 908. In some implementations, shared array 906 may be distributed across distributed network 112 in a manner such that shared array 906 may comprise the hashes and identifying information and/or metadata associated with each (or all) node's shared information. For instance, shared array 906 may comprise a single array in some implementations, where each node may be identified by a unique identifier or locator.

As described above, node 902 may also be configured to interact with a distributed sub-chain that has a universal resolver. For instance, node 902 may compute a root hash of at least one of (or all) of its claim hashes (e.g., stored in shared array 906), sign the computed root hash (e.g., a Merkle tree root or tree head) using its private key, and interact with a universal resolving sub-chain to store the signed ciphertext to resolving array 324. In examples, resolving array 324 may comprise a universal resolving array that contains the root hashes for all nodes in distributed network 112, with each node being identified by its respective identifier or locator. As described herein, resolving array 324 may be implemented or propagated across a plurality of nodes of distributed network 112 to ensure that each node's shared array 908 has not been tampered. In other words, because the root hash of each node's claims may be propagated across various nodes of the network, an attempt to tamper with a particular node's shared array 908 would not be successful because the root hash of such a tampered array will be inconsistent with the particular node's root hash stored across different nodes of the network in resolving array 324. As a result, resolving array 324 may further enhance the security of system 900 by maintaining the integrity of each node's shared array 906.

As shown in FIG. 9A, node 902 may transmit 920 a packet set to node 908 that includes the encrypted profile information, identifier, and claim hash described earlier. Node 908, upon receipt, may decrypt the encrypted packet set, e.g., by using its private key to decrypt the profile information and the identifier, and using the public key of node 902 to decrypt the received claim hash. Node 908 may recompute the data hash from the received profile information and recompute the claim hash from the received identifier and the recomputed data hash. By independently recomputing the claim hash from the received information, node 908 may compare the recomputed claim hash with the decrypted claim hash to validate the authenticity of the profile information received from node 902. In some further implementations, node 908, as an alternative or in addition to the aforementioned validation, may validate the recomputed claim hash and/or decrypted claim hash with a corresponding claim hash stored in shared array 906. For instance, where a corresponding claim hash is located in shared array 906, node 908 may validate the received profile information. Node 908 may also be configured to store, in an array 926, information identifying the received confidential data, including but not limited to the identity of node 902, an identification of the received information (e.g., the profile information in this example), and/or the validated claim hash. In examples, array 926 may be protected using a symmetric private key of node 908, thereby preventing array 926 from being accessed by other nodes of distributed network 112.

Upon receiving such a token and hash from an employer, node 902 may also be configured to generate a new root hash based on at least one of (or all) of the current claim hashes of node 902 (e.g., claim hashes stored shared array 906 and claim hashes stored in the array identifying information other nodes have shared with node 902), and propagate the new root hash in resolving array 324 to a plurality of other nodes of distributed network 112.

In a further implementation, upon validating the received profile information, node 908 may also share 924 an acknowledgement and/or updated profile information with node 902. For example, where node 908 represents an employer, node 908 may generate a token or the like indicating that a user of node 902 is employed by the employer for sharing with node 902. In examples, the employee token may be shared with node 902 in a similar manner as described herein. For instance, node 908 may generate an identifier, a data hash, and a claim hash using techniques described previously. Node 908 may share the token, identifier, and claim hash in a manner described above in which 902 may validate, and node 902 may subsequently store appropriate identifying information in an array (e.g., an array identifying information that other nodes have shared with node 902) that is protected using a symmetric private key of node 902. Furthermore, the token received by node 902 may also be encrypted using a symmetric key of 902 (or any other suitable encryption technique), thereby preventing the block of node 902 containing the token indicating an employment status from being accessed by other nodes unless expressly shared by node 902 (or node 908).

As mentioned, a user of node 902 may subsequently share the token with a third node (not expressly shown in FIG. 9A) to verify that the user is an active employee of the entity associated with node 908. In such examples, the user of node 902 may share the same token as proof of its employment status with any other node in a similar manner (e.g., by transmitting the token, identifier, and the claim hash it received using one more encryption techniques). The third node may similarly decrypt the received information, validate the received claim hash against a regenerated claim hash, and/or validate such claim hashes against a corresponding hash stored in a shared array of node 908. Because the employment token is managed by node 908 in (e.g., by storing it in a shared array of node 908 that can be revoked by only by node 908), a user of node 908 may revoke the token in its shared array at will or upon termination of the employee, thereby preventing a user of 902 (e.g., a former employee) from sharing a valid employment status with another node. As a result, using techniques described herein, node 908 may retain control over employment status information of a user of node 902. It is understood that examples are not limited to this particular implementation and may include others as well. For instance, upon termination of employment, a user of node 902 may revoke an existing token and transmit a new token that verifies that the user was a former employee, which a user of node 902 may reshare with other nodes, enabling the user to validate a former employment history. Furthermore, example embodiments are not limited to implementations in an employment context, but may include any other implementation in which user information (e.g., educational information, professional information, employment information, other user information, dating profile information, health information or medical records, financial information, tax information, business information, legal documents, biographic information, etc. could be transmitted in a manner where validation by the transmitting party and/or a third party may be appropriate.

Figure 9B:
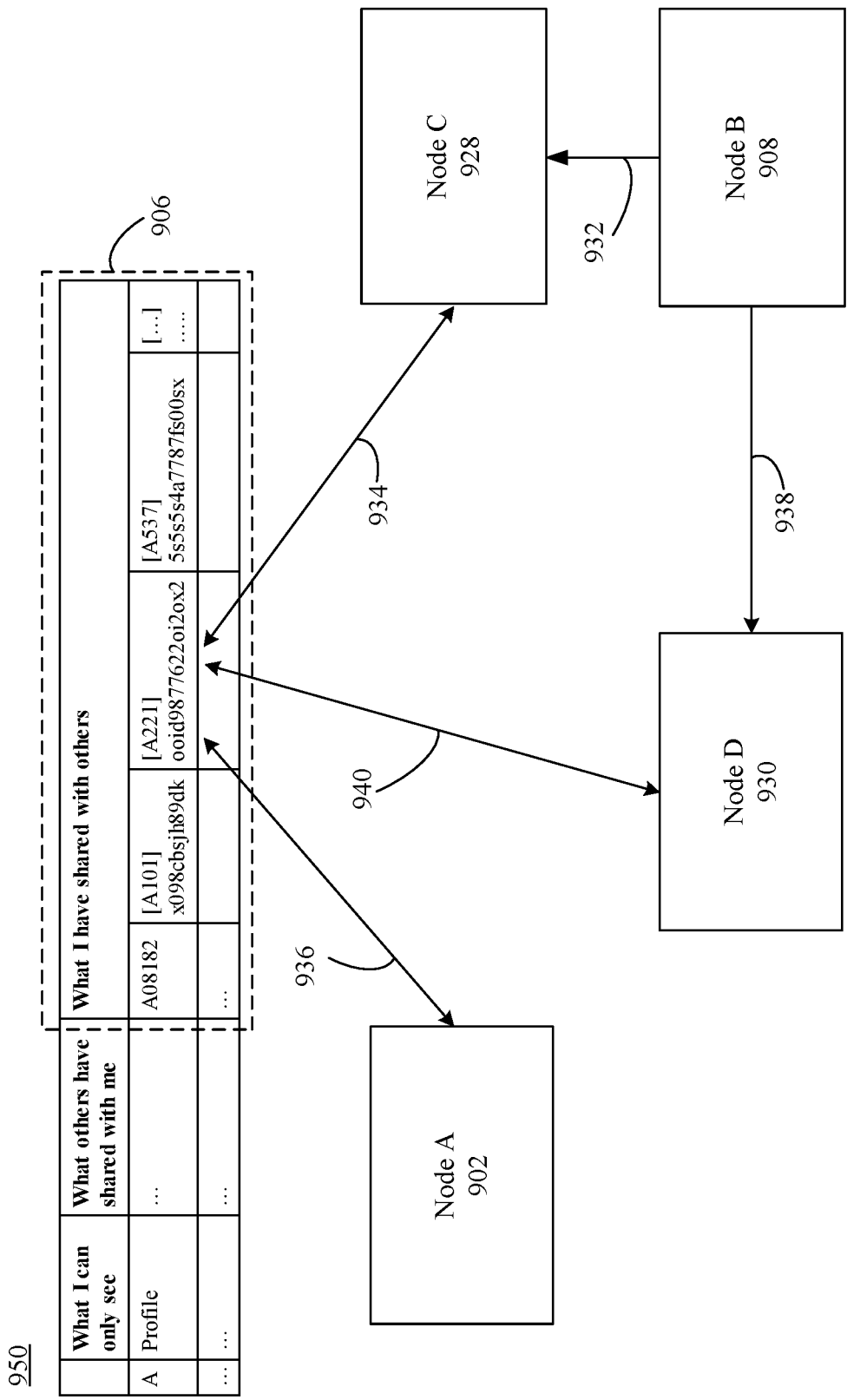

FIG. 9B depicts an example system 950 illustrating techniques described above where a node receiving confidential information may reshare the information with one or more additional nodes. As shown in FIG. 9B, system 950 includes node 902 (node A), shared array 906, node 908 (node B), a node 928 (node C), and a node 930 (node D). Node 928 and node 930 are examples of network node 102 that are part of distributed network 112 and may each comprise distributed sharing system 104 as described herein.

In the illustration of FIG. 9B, node 902 may be configured to share certain confidential data 106 (e.g., profile information) with node 908, as described with respect to FIG. 9A. In an example, node 908 may subsequently share 932 confidential information 106 received from node 902 to a different node, such as node 928 using similar techniques. For instance, node 908 may be configured to transmit a data packet set to node 928 that includes at least the profile information of node 902 and identifier 304 generated by node 902 in an encrypted fashion (e.g., using a public key of node 928). Node 928 may decrypt the received data packet set using its private key and recompute the claim hash from the received profile information and the identifier. Upon recomputing the claim hash, node 928 may access 934 shared array 906 of node 902 to determine whether a corresponding claim hash is present to validate the authenticity of the received profile information. For instance, where a corresponding claim hash is located that matches the recomputed claim hash, the profile information that node 928 received may be validated as authentic. Where a corresponding hash cannot be located, node 928 may fail to validate the received profile information and thus determine that the information shared by node 906 is not authentic and/or not trustworthy.

In some further implementations, node 906 may also transmit, as part of the data packet set to node 928, the encrypted claim hash originally received from node 902 (signed using the private key of node 902). In such examples, node 928 may use the public key of node 902 to decrypt the received claim hash and compare the decrypted claim hash with the recomputed claim hash to further validate that the received profile information originated from node 902.

As noted above, a user of node 902 may selectively revoke any claim hash stored in shared array 906. For example, a user of node 902 may interact with a suitable user interface as described previously to revoke a claim hash corresponding to information that the user shared with another node. In such an example, node 902 may interact 936 with shared 906 to revoke (e.g., remove) the corresponding claim hash from shared array 906. For instance, node 906 may attempt to reshare the profile information with node 930 (e.g., by transmitting a packet set encrypted using a public key of node 930 containing the profile information and the identifier generated by node 902). Node 930 may decrypt the data packet set and recompute the claim hash in a similar manner as described above. However, because node 902 revoked the claim hash in this instance, node 930 cannot successfully validate the received profile information as authentic when interacting 940 with shared array 906. In this manner, a user of node 902 may retain control over the ability for other nodes to share validated information with additional nodes of distributed network 112, including preventing nodes from further sharing of its confidential information.

Accordingly, the techniques described enable node 902 to maintain control for any shared claim (e.g., profile information, education information, etc.) and also selectively extend read-only and/or share permissions to any other node of distributed network 112. If a user of node 902 decides, at any point in time, to prevent further validation of its shared claim, the user may revoke the corresponding entry in its shared array, rendering the shared claim non-verifiable, stale, and/or non-sharable, therefore allowing the user to maintain its status as the primary owner of its confidential information. As a result, access policies may be efficiently implemented in a distributed, self-governed and non-sovereign ecosystem comprised of heterogenous nodes. In other words, techniques described herein may provide controllable, revocable, seamless, and encryptable end-to-end access to data shared as a value or copy (rather than a reference or pointer), while also maintaining the integrity and security of the shared data onboarded to a distributed ecosystem comprised of such heterogenous nodes.

III. Example Mobile and Stationary Device Embodiments

Network node 102, distributed sharing system 104, network nodes 108A-108N, identifier assignor 302, hash generator 306, encrypter 312, communication interface 316, array manager 318, shared array 320, root hash manager 322, resolving array 324, user interface 326, decrypter 328, data authenticator 330, components and/or subcomponents of systems 900 and 950, flowchart 200, flowchart 400, flowchart 500, flowchart 600, flowchart 700, and/or flowchart 800 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of network node 102, distributed sharing system 104, network nodes 108A-108N, identifier assignor 302, hash generator 306, encrypter 312, communication interface 316, array manager 318, shared array 320, root hash manager 322, resolving array 324, user interface 326, decrypter 328, data authenticator 330, components and/or subcomponents of systems 900 and 950, flowchart 200, flowchart 400, flowchart 500, flowchart 600, flowchart 700, and/or flowchart 800 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
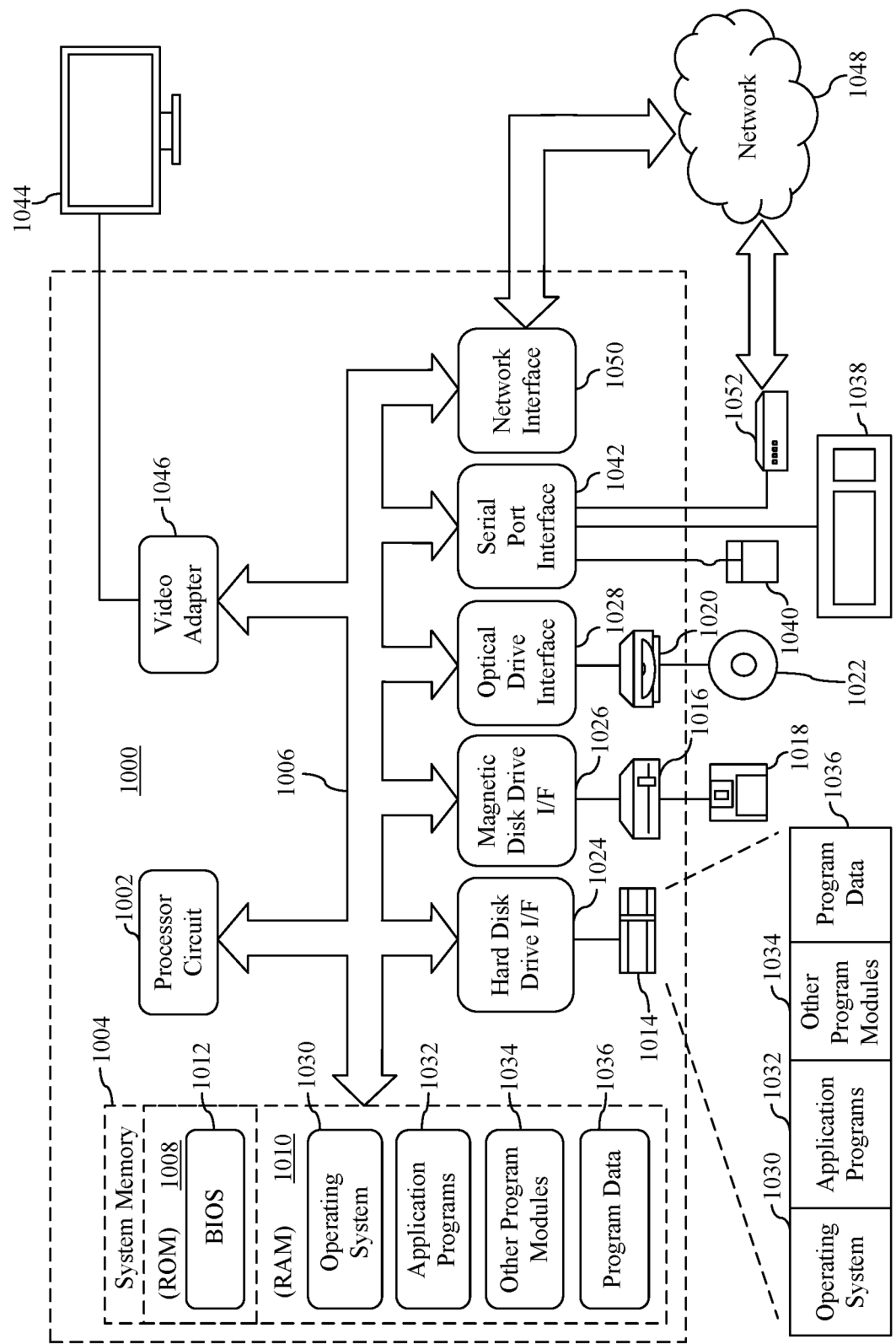
FIG. 10 shows a block diagram of an example computing device that may be used to implement example embodiments.

FIG. 10 depicts an exemplary implementation of a computing device 1000 in which example embodiments may be implemented. For example, any of network node 102, distributed sharing system 104, network nodes 108A-108N, identifier assignor 302, hash generator 306, encrypter 312, communication interface 316, array manager 318, shared array 320, root hash manager 322, resolving array 324, user interface 326, decrypter 328, data authenticator 330, and/or components and/or subcomponents of systems 900 and 950 may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Example embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing network node 102, distributed sharing system 104, network nodes 108A-108N, identifier assignor 302, hash generator 306, encrypter 312, communication interface 316, array manager 318, shared array 320, root hash manager 322, resolving array 324, user interface 326, decrypter 328, data authenticator 330, components and/or subcomponents of systems 900 and 950, flowchart 200, flowchart 400, flowchart 500, flowchart 600, flowchart 700, and/or flowchart 800 (including any suitable step of flowcharts 200, 400, 500, or 600) and/or further example embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of example embodiments described herein. Accordingly, such computer programs represent controllers of the computing device 1000.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A data management system for controlling data access in a distributed network is described herein. The system includes: one or more processors; and one or more memory devices that store program code configured to be executed by the one or more processors, the program code comprising: an identifier assignor configured to generate an identifier for confidential data; a hash generator configured to: generate a first hash of the confidential data; and generate a second hash based on the first hash and the identifier; an encrypter configured to encrypt a data packet set that includes the confidential data, the identifier, and the second hash; and a communication interface for transmitting the data packet set from an owning node to a first receiving node of the confidential data, the owning node and the first receiving node being part of the distributed network.

In one implementation of the foregoing system, the encrypter is configured to encrypt the confidential data and the identifier using a public key of the first receiving node, and encrypt the second hash using a private key of the owning node.

In another implementation of the foregoing system, the system includes an array manager configured to store the second hash in a first array that is validated against an extracted hash decrypted using a public key of the owning node.

In another implementation of the foregoing system, the stored second hash is validated against an extracted hash decrypted by a second receiving node of the confidential data.

In another implementation of the foregoing system, the system further includes a user interface configured to present an interactive control, that when activated, revokes the stored second hash in the first array.

In another implementation of the foregoing system, the first array is accessible to the first receiving node and the second receiving node in an unencrypted format, the second receiving node being part of the distributed network.

In another implementation of the foregoing system, the system further includes a root hash manager configured to store, in a second array, a root hash of at least one of the hashes stored in the first array.

A method for controlling data access in a distributed network is described herein. The method includes: generating an identifier for confidential data; generating a first hash of the confidential data; generating a second hash based on the first hash and the identifier; encrypting a data packet set that includes the confidential data, the identifier, and the second hash; and transmitting the data packet set from an owning node to a first receiving node of the confidential data, the owning node and the first receiving node being part of the distributed network.

In one implementation of the foregoing method, the encrypting comprises:

encrypting the confidential data and the identifier using a public key of the first receiving node and encrypting the second hash using a private key of the owning node.

In another implementation of the foregoing method, the method further includes storing the second hash in a first array that is validated against an extracted hash decrypted using a public key of the owning node.

In another implementation of the foregoing method, the stored second hash is validated against an extracted hash decrypted by a second receiving node of the confidential data, the second receiving node being part of the distributed network.

In another implementation of the foregoing method, the method further includes presenting, an interactive control in a user interface that, when activated, revokes the stored second hash in the first array.

In another implementation of the foregoing method, the first array is accessible to the first receiving node and the second receiving node in an unencrypted format.

In another implementation of the foregoing method, the method further includes storing, in a second array, a root hash of at least one of the hashes stored in the first array.

A data access system for accessing data in a distributed network is described herein. The system includes: one or more processors; and one or more memory devices that store program code configured to be executed by the one or more processors, the program code comprising: a communication interface for receiving, in a first receiving node, an encrypted first data packet set from an owning node that includes confidential data, an identifier for the confidential data, and a second hash based on a first hash of the confidential data and the identifier, the receiving node and owning node being part of the distributed network; a decrypter configured to decrypt the first data packet set to extract the confidential data, identifier, and the second hash; a hash generator configured to: generate a third hash based on the confidential data; and generate a fourth hash based on the third hash and the identifier; a data authenticator configured to authenticate the confidential data based at least on a comparison of the second hash and the fourth hash.

In one implementation of the foregoing system, the decrypter is configured to decrypt the confidential data and the identifier using a private key of the first receiving node and decrypt the second hash using a public key of the owning node.

In another implementation of the foregoing system, the data authenticator is configured to: determine if the second hash is stored in an array of the owning node; and in response to determining that the second hash is stored in the array, authenticate the confidential data.

In another implementation of the foregoing system, the data authenticator is configured to, in response to determining that the second hash is not stored in the array, provide a notification that the confidential data was not authenticated.

In another implementation of the foregoing system, the communication interface is further configured to: transmit a second data packet set from the first receiving node to a second receiving node, the second data packet set including the confidential data, the identifier, and the second hash, the second hash being validated against a hash stored in an array of the owning node.

In another implementation of the foregoing system, the first array is accessible to the first receiving node and the second receiving node in an unencrypted format.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A data management system for controlling data access in a distributed network, comprising:
one or more processors; and
one or more memory devices that store program code configured to be executed by the one or more processors, the program code comprising:
an identifier assignor configured to generate an identifier for confidential data;
a hash generator configured to:
generate a first hash of the confidential data; and
generate a second hash based on the first hash and the identifier;
an array manager configured to store the second hash in a shared array of the owning node, the shared array interfacing with a chain of the distributed network that is accessible by a plurality of receiving nodes that includes a first receiving node in an unencrypted format;
an encrypter configured to encrypt a data packet set that includes the confidential data, the identifier, and the second hash; and
a communication interface for transmitting the encrypted data packet set from an owning node to the first receiving node of the encrypted data packet set, the owning node and the first receiving node being part of the distributed network.

2. The system of claim 1, wherein the encrypter is configured to encrypt the confidential data and the identifier using a public key of the first receiving node, and encrypt the second hash using a private key of the owning node.

3. The system of claim 1, wherein the stored second hash is validated against an extracted hash decrypted using a public key of the owning node.

4. The system of claim 3, wherein the stored second hash is validated against an extracted hash decrypted by a second receiving node of the confidential data.

5. The system of claim 4, wherein the plurality of receiving nodes includes the second receiving node, the second receiving node being part of the distributed network.

6. The system of claim 3, further comprising:
a user interface configured to present an interactive control, that when activated, revokes the stored second hash in the shared array.

7. The system of claim 3, further comprising:
a root hash manager configured to store, in a second array, a root hash of at least one of the hashes stored in the shared array.

8. A method for controlling data access in a distributed network, comprising:
generating an identifier for confidential data;
generating a first hash of the confidential data;
generating a second hash based on the first hash and the identifier;
storing the second hash in a shared array of the owning node, the shared array interfacing with a chain of the distributed network that is accessible by a plurality of receiving nodes that includes a first receiving node in an unencrypted format;
encrypting a data packet set that includes the confidential data, the identifier, and the second hash; and
transmitting the encrypted data packet set from an owning node to the first receiving node of the encrypted data packet set, the owning node and the first receiving node being part of the distributed network.

9. The method of claim 8, wherein said encrypting comprises:
encrypting the confidential data and the identifier using a public key of the first receiving node, and
encrypting the second hash using a private key of the owning node.

10. The method of claim 9, wherein the stored second hash is validated against an extracted hash decrypted by a second receiving node of the confidential data, the second receiving node being part of the distributed network.

11. The method of claim 10, wherein the plurality of receiving nodes includes the second receiving node.

12. The method of claim 8, wherein the stored second hash is validated against an extracted hash decrypted using a public key of the owning node.

13. The method of claim 12, further comprising:
presenting, an interactive control in a user interface that, when activated, revokes the stored second hash in the shared array.

14. The method of claim 12, further comprising:
storing, in a second array, a root hash of at least one of the hashes stored in the shared array.

15. A data access system for accessing data in a distributed network, comprising:

one or more processors; and
one or more memory devices that store program code configured to be executed by the one or more processors, the program code comprising:
- a communication interface for receiving, in a first receiving node, an encrypted first data packet set from an owning node that includes confidential data, an identifier for the confidential data, and a second hash based on a first hash of the confidential data and the identifier, the receiving node and owning node being part of the distributed network;
- a decrypter configured to decrypt the first data packet set to extract the confidential data, identifier, and the second hash;
- a hash generator configured to:
  generate a third hash based on the confidential data; and
  generate a fourth hash based on the third hash and the identifier; and
- a data authenticator configured to:
  determine if the second hash is stored in an array of the owning node; and
  in response to determining that the second hash is stored in the array, authenticate the confidential data based at least on a comparison of the second hash and the fourth hash.

16. The system of claim 15, wherein the decrypter is configured to decrypt the confidential data and the identifier using a private key of the first receiving node, and decrypt the second hash using a public key of the owning node.

17. The system of claim 15, wherein the data authenticator is configured to, in response to determining that the second hash is not stored in the array, provide a notification that the confidential data was not authenticated.

18. A data access system for accessing data in a distributed network, comprising:
one or more processors; and
one or more memory devices that store program code configured to be executed by the one or more processors, the program code comprising:
- a communication interface for receiving, in a first receiving node, an encrypted first data packet set from an owning node that includes confidential data, an identifier for the confidential data, and a second hash based on a first hash of the confidential data and the identifier, the receiving node and owning node being part of the distributed network;
- a decrypter configured to decrypt the first data packet set to extract the confidential data, identifier, and the second hash;
- a hash generator configured to:
  generate a third hash based on the confidential data; and
  generate a fourth hash based on the third hash and the identifier; and
- a data authenticator configured to authenticate the confidential data based at least on a comparison of the second hash and the fourth hash;
wherein the communication interface is further configured to transmit a second data packet set from the first receiving node to a second receiving node, the second data packet set including the confidential data, the identifier, and the second hash, the second hash being validated against a hash stored in an array of the owning node.

19. The system of claim 18, wherein the data authenticator is configured to:
determine if the second hash is stored in the array of the owning node; and
in response to determining that the second hash is stored in the array, authenticate the confidential data.

20. The system of claim 18, wherein the array is accessible to the first receiving node and the second receiving node in an unencrypted format.

* * * * *